J. B. McCLANATHAN.
MACHINE FOR SHARPENING CALKS OF HORSESHOES.
No. 62,048. Patented Feb. 12, 1867.
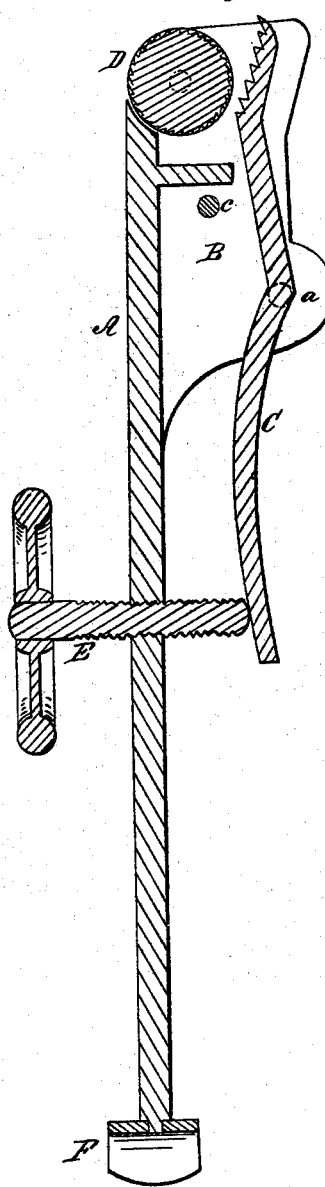
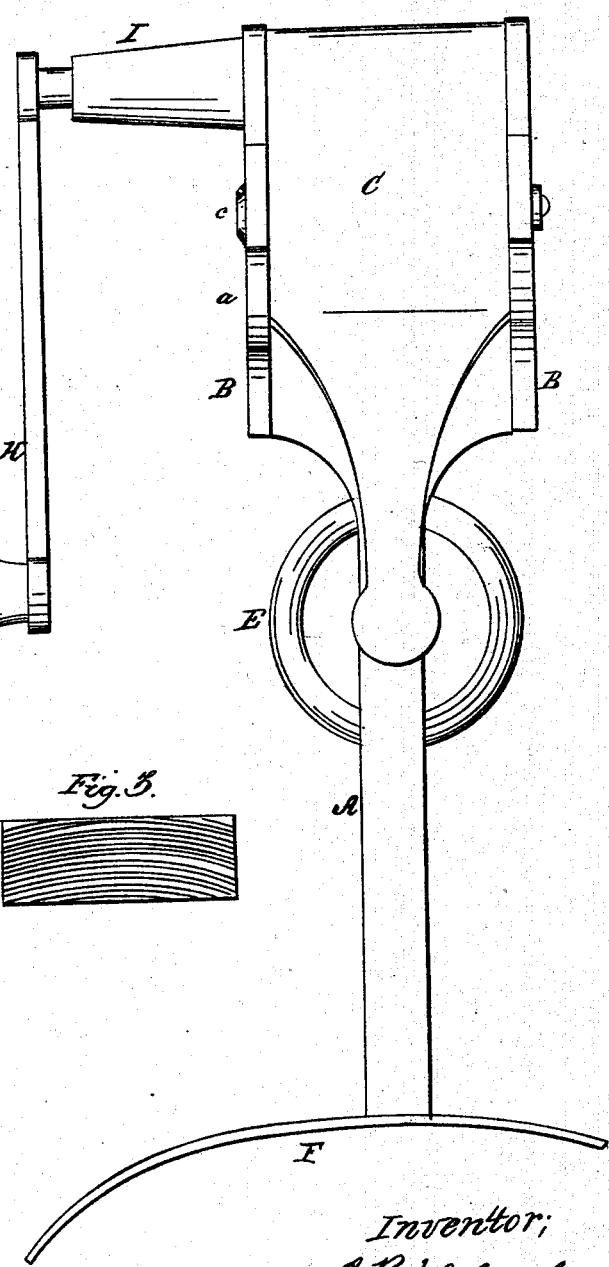

United States Patent Office.

J. B. McCLANATHAN, OF HORICON, WISCONSIN.

Letters Patent No. 62,048, dated February 12, 1867.

---

IMPROVED MACHINE FOR SHARPENING CALKS OF HORSE-SHOES.

---

The Schedule referred to in these Letters Patent and making part of the same.

---

TO ALL WHOM IT MAY CONCERN:

Be it known that I, J. B. McCLANATHAN, of Horicon, in the county of Dodge, and State of Wisconsin, have invented a new and improved Machine for Sharpening the Calks on Horse-Shoes; and I hereby declare that the following is a full, clear, and exact description thereof, reference being had to the accompanying drawings, making a part of this specification, and to the letters of reference marked thereon.

To enable others skilled in the art to construct and use my invention, I will proceed to describe it.

Figure 1 is a longitudinal section.

Figure 2, a rear elevation; and

Figure 3, a modification of the cutting burr.

My invention has for its object the furnishing of a tool by which the calks on horse-shoes may be sharpened without removing the shoe from the foot of the animal.

I first construct a frame for holding the cutting tool and rest, which frame consists of the piece A, having the side pieces B projecting from the rear face thereof, as shown in fig. 1. This frame A is made of cast iron, and has one of the side pieces B cast solid with it, the other being cast separately, in order to permit the ready insertion or change of the cutting burr D. A rest or supporting plate, C, is made of the form shown in fig. 1, and of proper width to fill the space between the side plates, as shown in fig. 2, said plate C being pivoted at $a$ of fig. 1. The upper end of this plate C is provided with a series of notches or ledges on its front face, as shown in fig. 1, to serve as supports for the point of the calk while being sharpened, and thus regulate the extent of the cutting on the calk. A screw, E, is inserted through the bar of the frame A, in such a position as to press against the lower end of the pivoted plate C, by which the upper end of said plate can be adjusted in relation to the cutting bur D, as shown in fig. 1. The cutting tool consists of a steel roller, D, provided with a series of cutting lips like an ordinary bur or milling tool. This bur is provided with a shaft, having its bearing in the side of plates B, and projecting through the sleeve I at one side, and has a crank, H, attached, as shown in fig. 2, by which it is rotated in the act of sharpening the calk. The bur D has its cutting lips extending spirally around it, for the purpose of producing a shear or draw cut, and by which several of the lips will be cutting at the same time, and thus cut more smoothly and evenly than they would if they were formed in lines parallel with the axis of the bur. Fig. 3 represents a bur having its cutting lips formed in curved lines, by which means the tendency to shove the calk to one side of the machine, caused by the oblique or spiral grooves, will be obviated.

The operation is as follows: The animal's foot being raised, the tool is applied by inserting the calk in the space between the bur and the plate C—the latter being adjusted to suit the thickness of the calk—when the crank is turned and the bur cuts away the calk until brought to an edge, the screw E being adjusted as may be necessary during the operation. A curved plate, F, is attached to the end of the frame A, for pressing with the body against the tool, to hold it firmly in place while in operation.

Having described my invention, what I claim, is—

1. The frame A, having the bur D mounted therein, in combination with the rigid pivoted plate C and set-screw E, arranged as described.

2. Providing the upper front face of the plate C with the corrugations, to act as rests or supports for the point of the calk, as described.

J. B. McCLANATHAN.

Witnesses:
 WM. DECKER,
 N. PERRY HULL.